United States Patent
Wieneke et al.

(10) Patent No.: US 10,699,246 B2
(45) Date of Patent: Jun. 30, 2020

(54) PROBABILITY BASED WHITELIST

(71) Applicant: SONICWALL INC., Milpitas, CA (US)

(72) Inventors: Paul R. Wieneke, Los Altos, CA (US); Scott D. Eikenberry, Menlo Park, CA (US); Tim Nufire, San Francisco, CA (US); David A. Koblas, Los Altos, CA (US); Brian K. Wilson, Palo Alto, CA (US)

(73) Assignee: SONICWALL INC., Milpitas, CA (US)

( * ) Notice: Subject to any disclaimer, the term of this patent is extended or adjusted under 35 U.S.C. 154(b) by 0 days.

(21) Appl. No.: 15/877,203

(22) Filed: Jan. 22, 2018

(65) Prior Publication Data

US 2018/0211226 A1 Jul. 26, 2018

Related U.S. Application Data

(63) Continuation of application No. 14/806,072, filed on Jul. 22, 2015, now Pat. No. 9,875,466, which is a continuation of application No. 13/348,318, filed on Jan. 11, 2012, now Pat. No. 9,092,761, which is a continuation of application No. 10/449,875, filed on May 29, 2003, now abandoned.

(51) Int. Cl.
*H04L 12/58* (2006.01)
*G06Q 10/10* (2012.01)

(52) U.S. Cl.
CPC .......... *G06Q 10/107* (2013.01); *H04L 51/12* (2013.01); *H04L 51/28* (2013.01)

(58) Field of Classification Search
CPC ........ H04L 51/12; H04L 51/28; G06Q 10/107
USPC ........................................................ 709/206
See application file for complete search history.

(56) References Cited

U.S. PATENT DOCUMENTS

| | | | |
|---|---|---|---|
| 5,761,669 A | 6/1998 | Montague et al. | |
| 6,112,227 A | 8/2000 | Heiner | |
| 6,161,130 A | 12/2000 | Horvitz et al. | |
| 6,199,102 B1 | 3/2001 | Cobb | |
| 6,321,267 B1 | 11/2001 | Donaldson | |
| 6,650,890 B1 | 11/2003 | Irlam et al. | |
| 6,732,157 B1 | 5/2004 | Gordon et al. | |
| 6,941,348 B2 | 9/2005 | Petry et al. | |
| 7,096,498 B2 * | 8/2006 | Judge ................... | G06F 21/554 726/22 |
| 7,249,175 B1 | 7/2007 | Donaldson | |
| 7,539,726 B1 | 5/2009 | Wilson et al. | |
| 7,653,698 B2 | 1/2010 | Wieneke | |
| 7,962,560 B2 | 6/2011 | Wieneke | |
| 9,092,761 B2 | 7/2015 | Wieneke | |
| 9,875,466 B2 | 1/2018 | Wieneke | |

(Continued)

OTHER PUBLICATIONS

"Majordomo FAQ," Oct. 20, 2001.

(Continued)

*Primary Examiner* — Minh Chau Nguyen
(74) *Attorney, Agent, or Firm* — Polsinelli LLP

(57) ABSTRACT

A system and method are disclosed for maintaining a whitelist, including: obtaining message data based on an email message sent by a user; extracting recipient information from message data; updating the whitelist using the recipient information.

20 Claims, 9 Drawing Sheets

(56) References Cited

U.S. PATENT DOCUMENTS

| | | |
|---|---|---|
| 2003/0033533 A1* | 2/2003 | Meisel ............... H04L 63/0823 713/185 |
| 2003/0076940 A1 | 4/2003 | Manto |
| 2003/0095550 A1 | 5/2003 | Lewis et al. |
| 2003/0131063 A1 | 7/2003 | Breck |
| 2003/0212791 A1 | 11/2003 | Pickup |
| 2003/0220978 A1 | 11/2003 | Rhodes |
| 2003/0233418 A1 | 12/2003 | Goldman |
| 2004/0015554 A1* | 1/2004 | Wilson ................. G06Q 10/107 709/206 |
| 2004/0024639 A1 | 2/2004 | Goldman |
| 2004/0111531 A1* | 6/2004 | Staniford ............... H04L 29/06 709/246 |
| 2004/0148358 A1 | 7/2004 | Singh et al. |
| 2004/0158554 A1 | 8/2004 | Trottman |
| 2004/0177120 A1* | 9/2004 | Kirsch .................... H04L 29/06 709/206 |
| 2004/0203589 A1 | 10/2004 | Wang et al. |
| 2005/0055410 A1 | 3/2005 | Landsman et al. |
| 2005/0125667 A1 | 8/2005 | Sullivan et al. |
| 2012/0331069 A1 | 12/2012 | Wieneke |
| 2015/0341296 A1 | 11/2015 | Wieneke |

OTHER PUBLICATIONS

Anon, "Giant Company Software Announces Full Integrated AOL Support for its Popular Spam Inspector Anti-Spam Software," GIANT Company Software, Inc., Nov. 15, 2002.
Anon, "Tagged Message Delivery Agent (TMDA)," http://tmda.net/indext.html, Jul. 25, 2002.
Barr, David "How Can I Restrict a List Such that only Subscribers can Send Mail to the List?" Jul. 25, 2003, http://greatcircle.com/lists/majordomo-workers/mhonarc/majordomo-workers.19941.
Byrne, Julian "My Spamblock," Google Groups Thread, Jan. 19, 1997.
Dwork, Cynthia et al., "Pricing via Processing or Combating Junk Mail," CRYPTO '92, Springer-Verlag LNCS 740, pp. 139-147, 1992.
Giant Company, "Giant Company Launches Spam Inspector," Jul. 25, 2003, http://giantcompany.com/pressReleases.aspx.
Guilmette, Ronald F., "To Mung or Not to Mung," Google Groups Thread, Jul. 24, 1997.
Langberg, Mike "Spam Foe Needs Filter of Himself," Email Thread dtd. Apr. 5, 2003.
McCullagh, Declan "In-Boxes that Fight Back," News.com, May 19, 2003.
Skoll, David F., "How to Make Sure a Human is Sending You Mail," Google Groups Thread, Nov. 17, 1996.
SpamAssassin, "Welcome to SpamAssassin," http://spamassassin.org, Jan. 23, 2003.
Templeton, Brad "Viking-12 Junk E-Mail Blocker," (believed to have last been updated Jul. 15, 2003).
Von Ahn, Luis et al., "Telling Humans and Computers Apart (Automatically) or How Lazy Cryptographers do AI," Communications to the ACM, Feb. 2004.
Wieneke, Paul R. et al., "Brief of Appellant," May 31, 2011, 52 pages.
Wieneke, Paul R. et al., "Brief for Appellee Director of the United States Patent and Trademark Office," Aug. 4, 2011, 33 pages.
Wieneke, Paul R. et al., "Reply Brief of Appellant," Aug. 22, 2011, 14 pages.
Wieneke, Paul R. et al., "Decision on Request for Rehearing," Nov. 30, 2010, 5 pages.
Wieneke, Paul R. et al., "Decision on Appeal," Jul. 19, 2010, 8 pages.
U.S. Appl. No. 10/449,875 Office Action dated Nov. 27, 2007.
U.S. Appl. No. 10/449,875 Final Office Action dated Aug. 7, 2007.
U.S. Appl. No. 10/449,875 Office Action dated Mar. 20, 2007.
U.S. Appl. No. 11/927,506 Office Action dated Mar. 5, 2009.
U.S. Appl. No. 13/348,318 Final Office Action dated Sep. 25, 2014.
U.S. Appl. No. 13/348,318 Office Action dated Feb. 18, 2014.
U.S. Appl. No. 13/348,318 Final Office Action dated Oct. 10, 2013.
U.S. Appl. No. 13/348,318 Office Action dated Mar. 15, 2013.
U.S. Appl. No. 14/806,072 Office Action dated Jan. 3, 2017.
U.S. Appl. No. 14/806,072 Final Office Action dated Sep. 8, 2016.
U.S. Appl. No. 14/806,072 Office Action dated Mar. 11, 2016.

* cited by examiner

| Address | Counter | | | | | | | | Probability of being allowable |
|---|---|---|---|---|---|---|---|---|---|
| | Individual | | Group | | Corporation | | Global | | |
| | BL | WL | BL | WL | BL | WL | BL | WL | |
| jane@aol.com | 0 | 1 | 0 | 0 | 0 | 0 | 0 | 0 | 100% |
| admin@mailfrontier.com | 0 | 0 | 0 | 0 | 0 | 0 | 0 | 1 | 100% |
| joe@msn.com | 0 | 0 | 2 | 3 | 0 | 0 | 0 | 0 | 60% |

FIGURE 4

PROBABILITY BASED WHITELIST

CROSS-REFERENCE TO RELATED APPLICATIONS

This application is a continuation and claims the priority benefit of U.S. patent application Ser. No. 14/806,072 filed Jul. 22, 2015, now U.S. Pat. No. 9,875,466, which is a continuation and claims the priority benefit of U.S. patent application Ser. No. 13/348,318 filed Jan. 11, 2012, now U.S. Pat. No. 9,092,761, which is a continuation and claims the priority benefit of U.S. patent application Ser. No. 10/449,875 filed May 29, 2003. The disclosures of which are incorporated by reference.

FIELD OF THE INVENTION

The present invention relates generally to electronic messages. More specifically, a method and a system for avoiding spam messages are disclosed.

BACKGROUND OF THE INVENTION

Electronic messages have become an indispensable part of modern communication. Electronic messages such as email or instant messages are popular because they are fast, easy, and have essentially no incremental cost. Unfortunately, these advantages of electronic messages are also exploited by marketers who regularly send out unsolicited junk messages. The junk messages are referred to as "spam," and spam senders are referred to as "spammers." Spam messages are a nuisance for users. They clog people's email box, waste system resources, often promote distasteful subjects, and sometimes sponsor outright scams.

A number of message filtering systems exist for mitigating the problems caused by spam. These systems often employ a whitelist technique, where a list of allowable sender addresses is maintained. These sender addresses are usually added by the user. Any messages coming from a sender in the whitelist is presumed to be a good, non-spam message. The whitelist test works as follows in some systems: once a message is received, the system looks up the sender address of the message in the whitelist. If the sender address is found in the whitelist, the message is classified as non-spam and delivered to the intended recipient. If, however, the sender address is not found in the whitelist, the message cannot be classified and further testing is needed to determine whether it is spam or non-spam.

Whitelisting is a widely accepted technique since it is useful in identifying non-spam messages, and performing a whitelist test incurs relatively low overhead on the system. The effectiveness of the whitelist depends on the entries in the whitelist; a well-maintained whitelist with many entries tends to be more useful than a whitelist that has very few entries. Since most of the systems require the user to manually add entries to his whitelist, addresses that should be added to the whitelist may be unintentionally left out, thereby making the whitelist less effective. Furthermore, many users find the manual process of adding whitelist entries somewhat tedious, and thus desire a more automated process. Also, it may be problematic or inconvenient to upload whitelists from clients to servers on systems where email filtering is implemented on a server. It would be useful to have a way to maintain a whitelist that requires less manual intervention, and improves the effectiveness of the whitelist.

SUMMARY OF THE INVENTION

Exemplary embodiments provide a mechanism for updating hierarchical whitelists. In one embodiment, a message application software accesses message data associated with an e-mail message sent by a sender to a recipient in a network. The message application software extracts sender information and recipient information from the message data and sends the extracted information to a server that updates a plurality of whitelists on the server with the extracted information. The plurality of whitelists are associated with the sender and a group of users that share whitelists entries. The recipient is identified as being allowed to send e-mail messages to the sender and the group of users.

BRIEF DESCRIPTION OF THE DRAWINGS

The present invention will be readily understood by the following detailed description in conjunction with the accompanying drawings, wherein like reference numerals designate like structural elements, and in which:

FIG. 4 is a chart illustrating a probabilistic whitelist for a trusted user, according to one embodiment.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

An improved technique for maintaining a whitelist is disclosed. In this specification, a whitelist is used to refer to a collection of data that can be used to identify email messages sent by allowable senders. In some embodiments, a system obtains message data based on an email message sent by a user and extracts recipient information from the message data. Message data refers to information pertaining to the email message. It may come from a variety of sources, and can be obtained using techniques including intercepting incoming email messages, monitoring email activities, reading log information, reading stored email messages, or any other appropriate technique. The whitelist is then updated using the recipient information. In some embodiments, a message tap is used to obtain the message data. Hierarchical and/or probabilistic whitelists are employed in some embodiments.

As used herein, a recipient may refer to any individual, device, organization or other entity that is associated with the receiving of an email. Recipient information refers to information pertaining to the recipient, including a person's name, an email address, a domain name, an IP address, an email server identifier or any other appropriate information. Similarly, the sender may refer to any individual, device, organization or other entity that is associated with the sending of an email, and the sender information refers to any information pertaining to the sender.

Figure 1A:
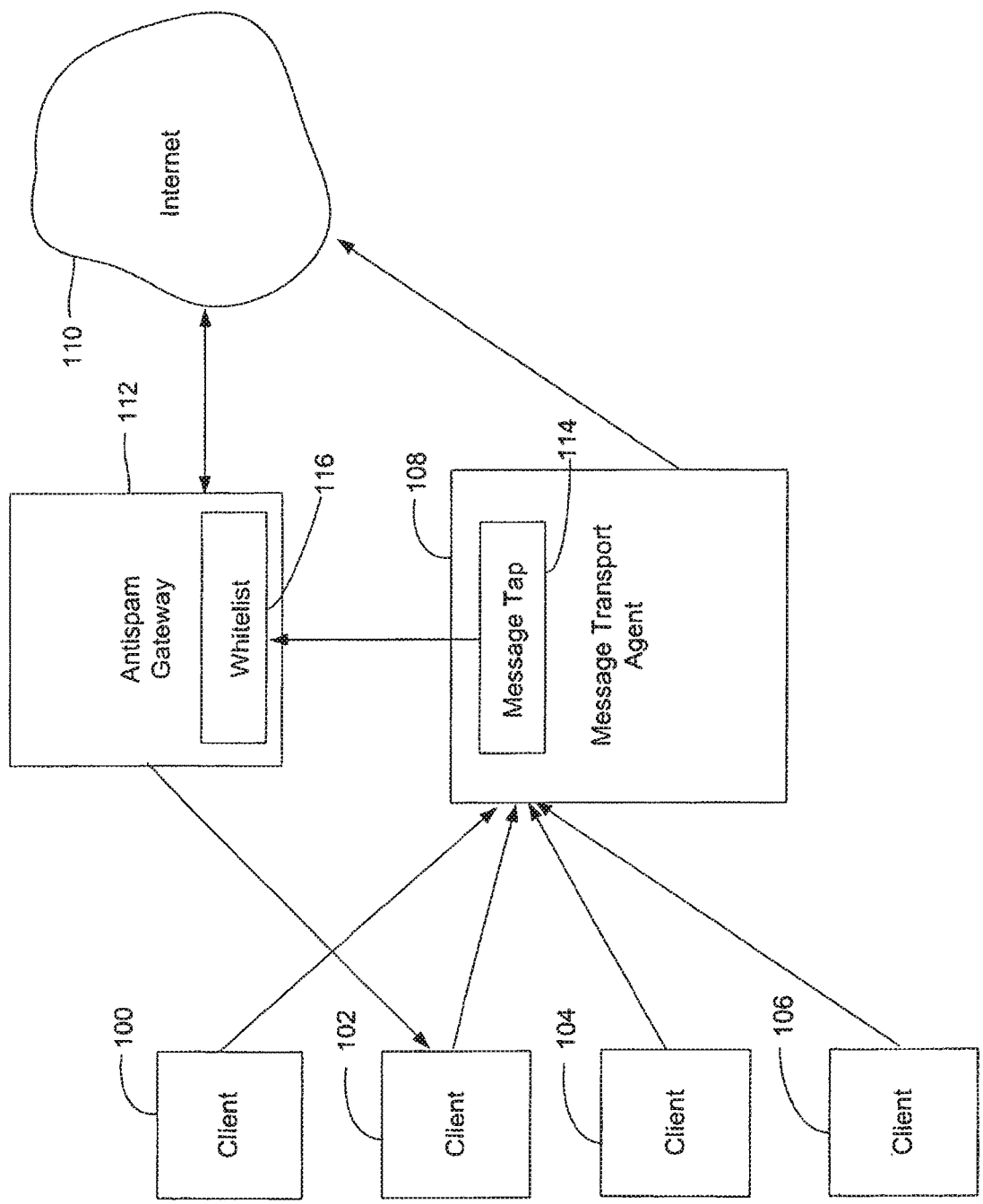
FIG. 1A is a block diagram illustrating a system embodiment that maintains an automated whitelist.

FIG. 1A is a block diagram illustrating a system embodiment that maintains an automated whitelist. The system facilitates the email communication between users on the corporate/organization network (Intranet) and other users on the Internet. The Intranet users are also referred to as trusted users, since they are the ones the system aims to protect from spam messages. The system also facilitates the email communication among trusted users. Trusted users use mail clients such as 100, 102, 104 and 106 to send outbound email messages. These messages are sent to a message transport agent 108.

The message transport agent forwards the outbound email to either the Internet or the Intranet, depending on the location of the recipient. The message transport agent also logs the activity to a log file. A message tap 114 residing on the message transport agent is used to obtain message data based on email messages sent by the user. The message data is obtained by reading the log file that includes sender and recipient information of email messages from the trusted users. It should be noted that there are alternative ways to obtain the message data. For example, the message transport agent may send logs regarding email messages to the network and the message tap may be configured to receive these logs. In some embodiments, the message data is the email message itself, which is intercepted or accessed by the message tap.

Sender and recipient information is then extracted from the message data. Generally, since most people only send messages to recipients they know and trust, if a sender sends a message to a recipient, the recipient is unlikely to be a spammer, and the sender should be willing to accept further messages from that recipient. Thus, message tap 114 sends the extracted sender and recipient information to anti-spam gateway 112, which updates a whitelist 116. The anti-spam gateway is a server that processes incoming messages sent from the Internet, intended for the protected users on the Intranet. It performs functions such as message classification and filtering to keep spam messages from being delivered to the protected users. In some embodiments, the anti-spam gateway is a part of the message transport agent. In some embodiments, each protected user has an individual whitelist that is customizable, and the sender information is used to identify whose whitelist should be updated. By monitoring messages sent by the protected user, the whitelist is generated automatically and independently by the server. There is no need for whitelist management to be implemented on the client machine. This simplifies original deployment and updating of the whitelist software. The anti-spam gateway uses the whitelist to filter any incoming message intended for a protected user on the network. A non-spam message is delivered directly, or forwarded to the message transport agent and then delivered.

In some embodiments, the protected users are all trusted users and communication among trusted users is always allowed. For example, a message sent by a trusted user on client 100, intended for another trusted user on client 102 is always considered non-spam and delivered. There are various ways to achieve this. For example, the message transport agent may identify that the sender and the recipient are both trusted users, and send the message to the recipient directly.

Figure 1B:
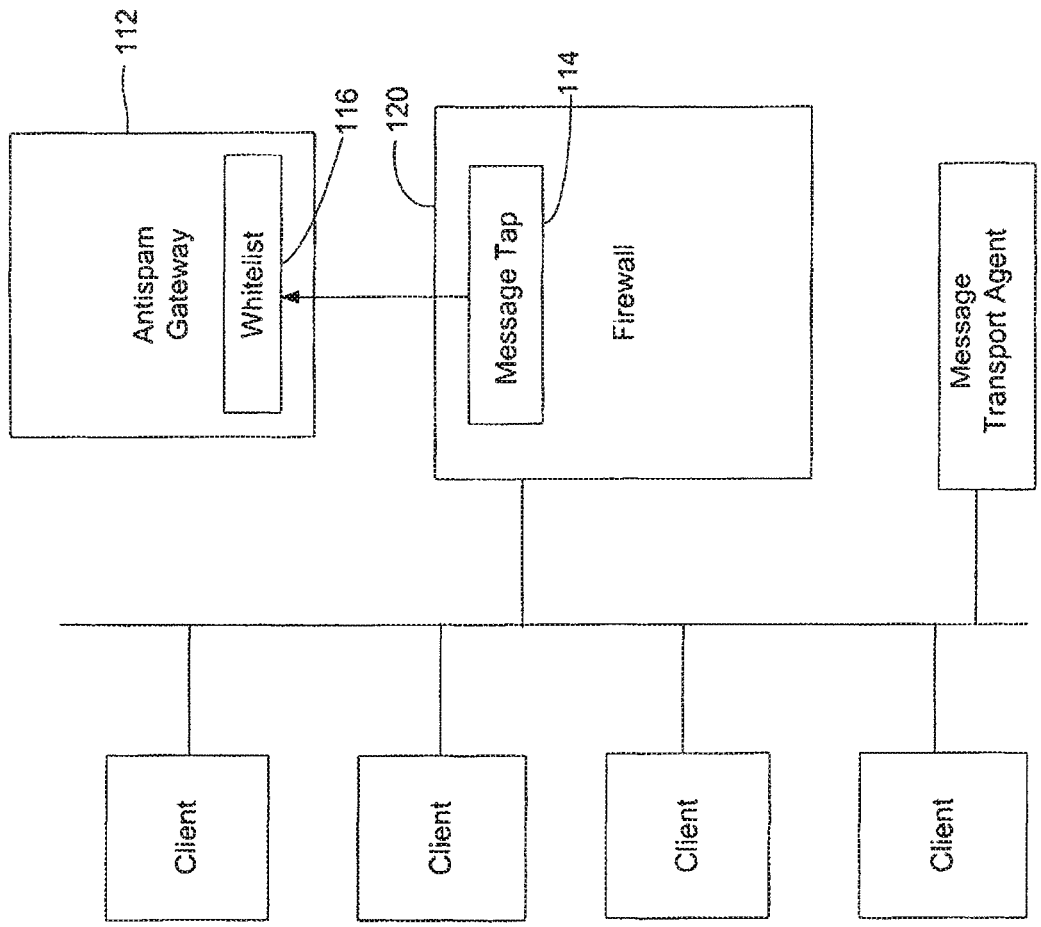
FIG. 1B is a block diagram illustrating another system embodiment that maintains an automated whitelist.

It should be noted that the message tap may be any appropriate software and/or hardware component, and may be located on the message transport agent or any other appropriate locations where message data can be detected. FIG. 1B is a block diagram illustrating another system embodiment that maintains an automated whitelist. In this embodiment, message tap 114 resides on a firewall 120. The firewall monitors activities on the network and logs these activities, including outbound email activities from a trusted user to an Internet user. A message tap examines the firewall log and extracts the recipient information based on log messages pertaining to the outbound email messages. The recipient information is added to a whitelist 116 that resides on the anti-spam gateway 112. As noted above, an individual whitelist may be maintained for each sender by also noting sender address for messages. In some embodiments, a single whitelist is maintained for all protected users.

Figure 1C:
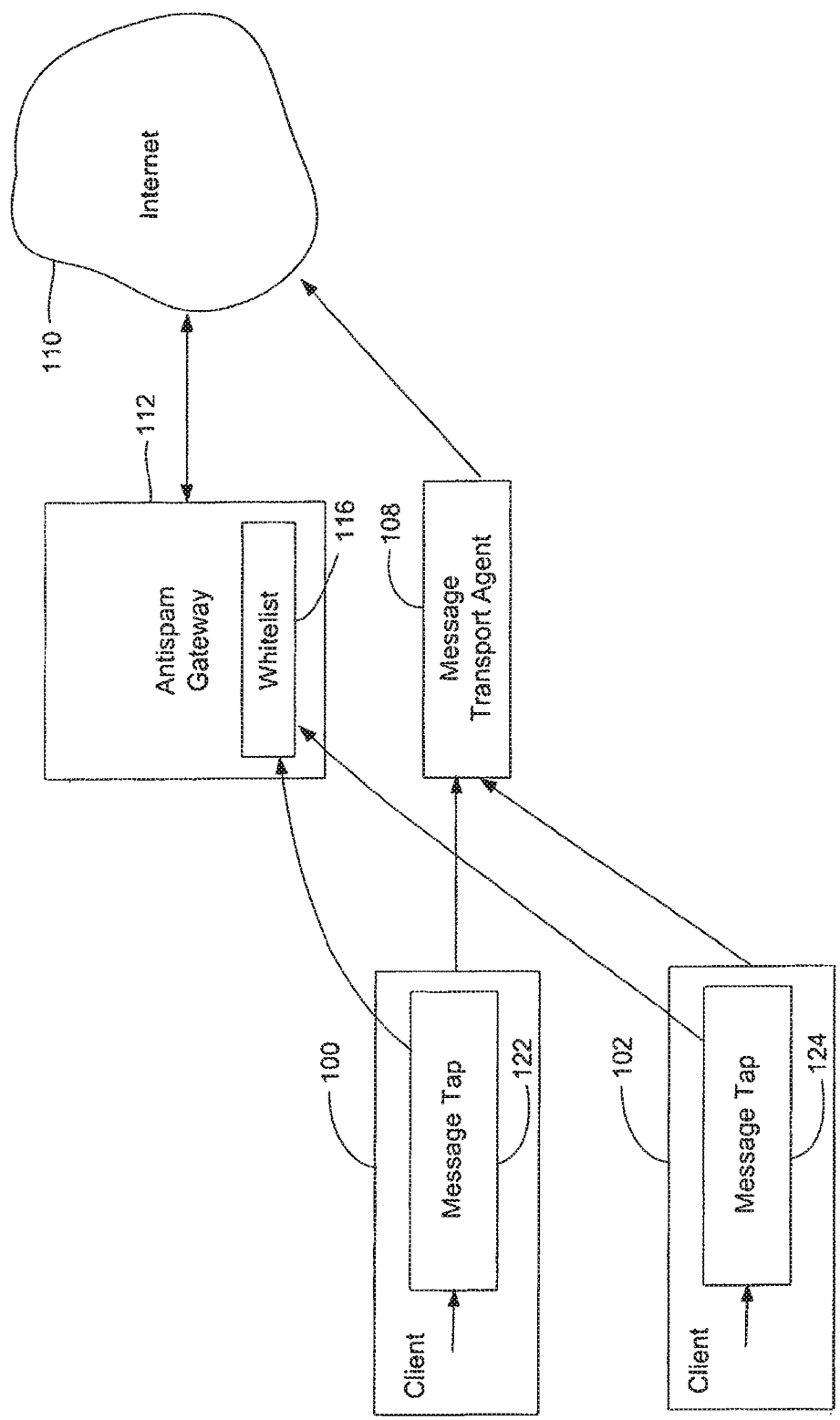
FIG. 1C is a block diagram illustrating another system embodiment.

FIG. 1C is a block diagram illustrating another system embodiment. In this embodiment, multiple message taps 122 and 124 reside on mail clients 100 and 102, respectively. When a trusted user sends an outbound message via one of these mail clients, the message tap that resides on the client intercepts this message and extracts sender and recipient information from the message that is being sent. The recipient information is added to the whitelist or set of whitelists that reside on anti-spam gateway 112.

Figure 2:
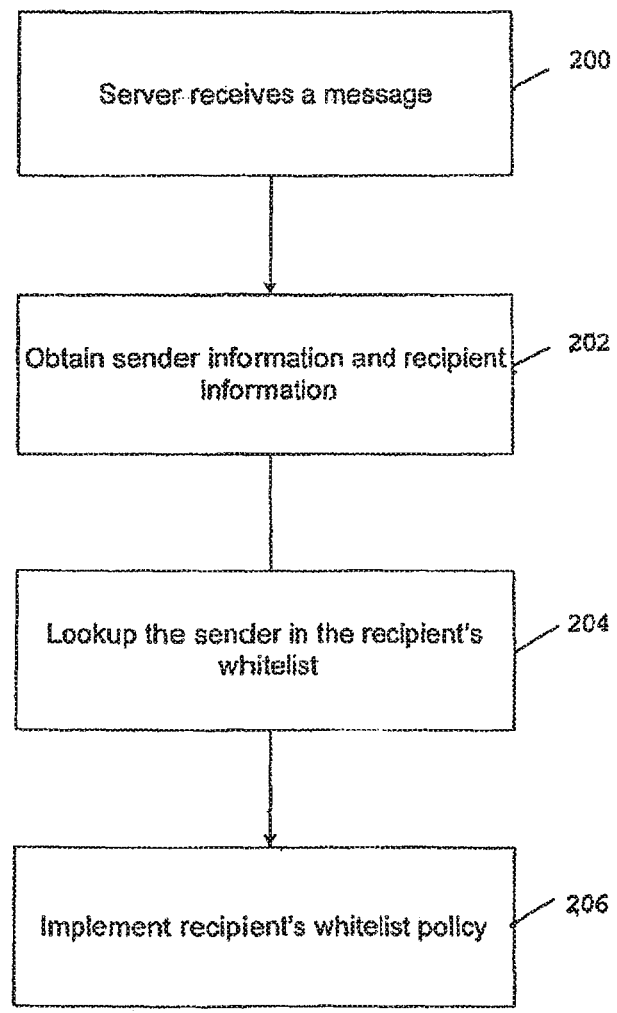
FIG. 2 is a flowchart illustrating a server process for processing an inbound message.

An inbound message sent by an Internet user, intended for a trusted user is received by a server. As shown in FIGS. 1A-1C, the server is an anti-spam gateway that uses the whitelist to filter the message. FIG. 2 is a flowchart illustrating a server process for processing an inbound message. Once the server receives a message (200), it parses the message to obtain sender information and recipient information (202). The server then looks up the sender information in the recipient's whitelist (204), and implements the recipient's whitelist policy accordingly (206). In some embodiments, the sender information of the message is compared to the addresses in the whitelist. If the sender address is found in the whitelist, then the sender is an allowable sender and the message is promptly delivered. If the sender address is not found in the whitelist, the message is somewhat suspect and should be further processed by the anti-spam gateway to determine whether the message is spam or non-spam. In some embodiments, the server may maintain a collective whitelist for groups of users in addition to individual whitelists. Users may be allowed to join groups and share whitelist entries or users may be assigned to a group (for example, their division or working group within a company) with which the user will share whitelist entries. The combination of individual whitelists and the shared whitelist made possible by the server analysis of outgoing email messages gives the system considerable flexibility.

Figure 3A:
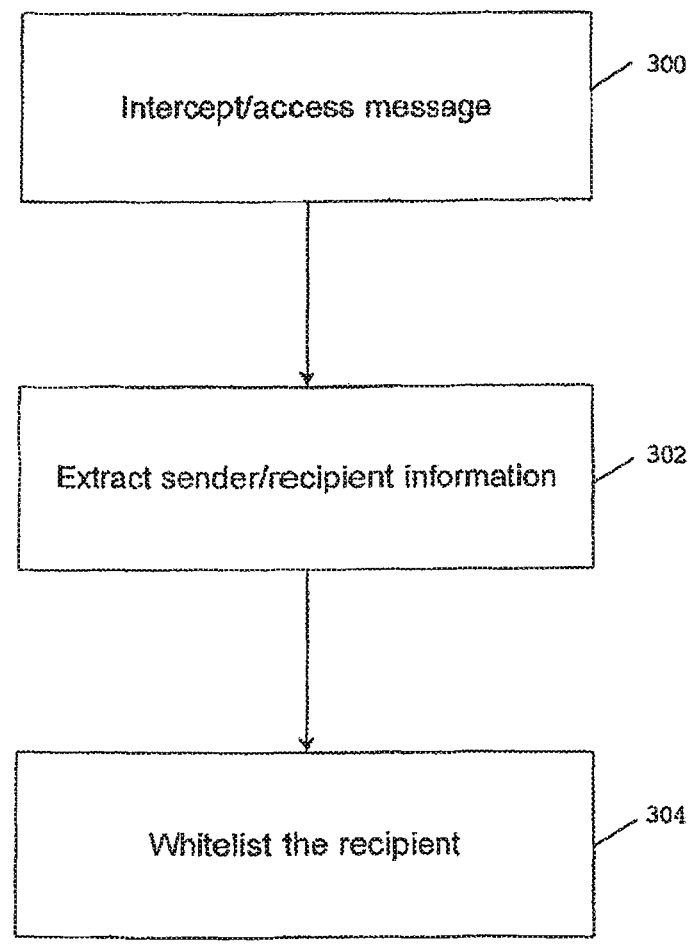
FIG. 3A is a flowchart illustrating a process for whitelisting a recipient, according to one embodiment.
Figure 3B:
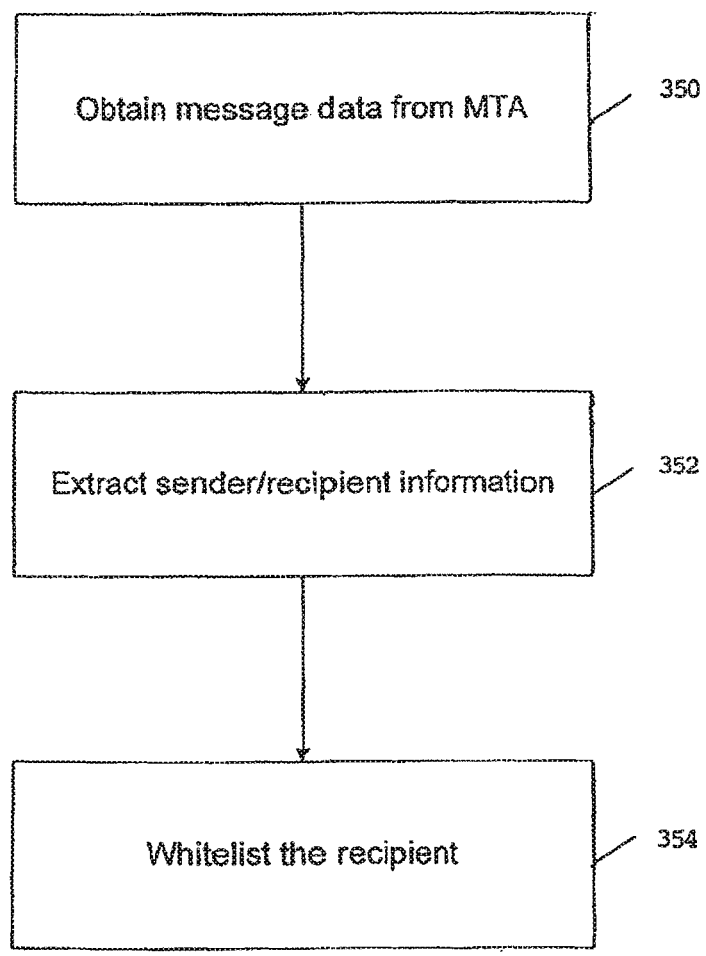
FIG. 3B is a flowchart illustrating a process for automatically updating a whitelist using the message tap according another embodiment.

Since the message tap implementation may vary for different embodiments of the system, the process for whitelisting a recipient may also vary. FIG. 3A is a flowchart illustrating a process for whitelisting a recipient, according to one embodiment. The message tap intercepts or accesses the message to obtain message data (300). The system configuration may be similar to the embodiment shown in FIG. 1C, where the message tap is configured to intercept outbound email messages. In some embodiments, the message tap is configured to access an email message by reading a database of sent messages. Sender information and recipient information is then extracted from the message data (302). The whitelist is updated with the recipient information (304). FIG. 3B is a flowchart illustrating a process for automatically updating a whitelist using the message tap according another embodiment. A message tap obtains message data from the message transport agent (350). In some embodiments, this is done by reading a log file generated by the message transport agent. In some embodiments, the information is obtained by receiving log events sent by the message transport agent. The sender and recipient information is extracted (352) and then updates the whitelist with the recipient information (354). It should be noted that the sender and recipient information extraction may be performed by any appropriate components of the system, including the message tap and the anti-spam process that maintains the whitelist.

In some embodiments, the server includes whitelists that are hierarchical. One level of the hierarchy is an individual whitelist that is customizable for every trusted user. On another level, groups or divisions have their own whitelists that are formed using information collected from individual users within the groups or divisions. This type of whitelist is also referred to as a collaborative whitelist. On another level, a corporate whitelist is used to maintain whitelisted addresses that are applicable to all the users and groups within the corporation or organization. A global whitelist is sometimes employed by the list provider to allow certain addresses such as the administrators of the service provider to be whitelisted. It should be noted that different hierarchical levels and structures may also be used.

In some embodiments, the whitelists entries are probabilistic. In other words, the entries in the whitelist are each given a probability of being allowable. FIG. 4 is a chart illustrating a probabilistic whitelist for a trusted user, according to one embodiment. A whitelist entry includes an email address obtained from the message data, whitelist counters for all the levels in the hierarchy, blacklist counters for all the levels in the hierarchy, and a probability of the address being an allowable address. The whitelist counters and the blacklist counters are used to track how many times messages from the given email address have been indicated as non-spam or spam, respectively, by various members in the hierarchy. Different individuals may disagree on whether a message is spam; for example, some users in a group may blacklist an address while others whitelist the same address. Thus, the blacklist and whitelist counter values are taken into consideration for arriving at the probability of being allowable for a given address. Rules and formulas for deriving the probability may differ for different embodiments. For example, the various blacklist and whitelist counters may have different weights used in computing the probability; there may be rules governing the relationships between the hierarchies, and the blacklist or whitelist in one hierarchy may override some other hierarchy.

In the example, the first address, jane@aol.com, has been whitelisted once by the individual user. It has not been blacklisted by anybody else. The resulting probability of this address being an allowable address is set to be 100 percent. The second address, admin@mailfrontier.com has not been flagged as either a blacklisted address or a whitelisted address by the individual, the group, or the corporation. However, it has been determined to be allowable and whitelisted once on a global level. Therefore, the probability of the address being allowable is also set to be 100 percent. The third address, joe@msn.com, has been determined to be the address of a spammer by some members of the group and added to the group blacklist twice, but it has also been added to the group whitelist three times by other members. Consequently, the probability of it being spam is calculated to be 60 percent.

It should be noted that there are a variety of methods that are applicable for computing the probability of the message being spam, including Bayesian Priors and thresholds. In some embodiments, the blacklist and whitelist counters for an address may be set to non-zero values initially. For example, the initial counter values for jane@aol.com may be set to 1 for both the blacklist and the whitelist. When its global whitelist counter is incremented, its probability of being spam drops from 50% to 33%.

Although the whitelist entries in the embodiment shown are identified by email addresses, other identifiers may also be used when appropriate. In some embodiments, the recipient information extracted from the message data is the domain name. Once a domain is considered allowable and is added to the whitelist, future messages sent by all the users from the same domain all become allowable. Using the domain name to identify whitelist entries provides a "looser" whitelist implementation and increases the system's efficiency. In some embodiments, the Internet protocol (IP) address of the recipient's domain is looked up via Domain Name System (DNS). Both the IP address and the email address are used to identify a whitelist entry, thus providing a more "strict" whitelist implementation and reducing the chances of spam messages with a spoofed email addresses (i.e. allowable email address but sent from the spammer's mail server) getting through.

Figure 5:
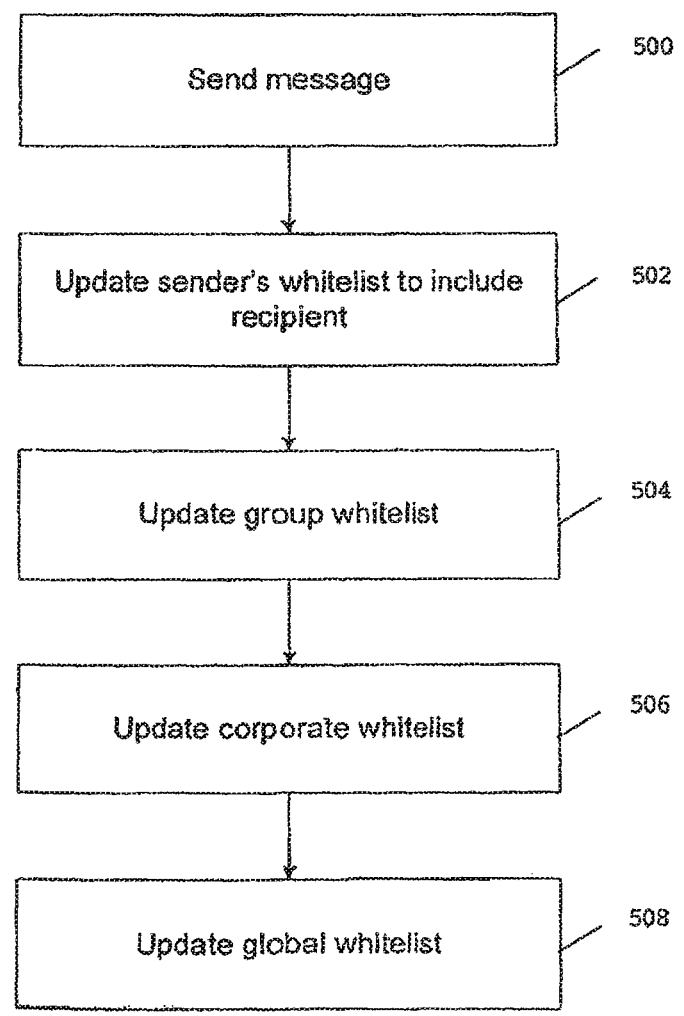
FIG. 5 is a flowchart illustrating the automatic updating of hierarchical whitelists according to an embodiment.

FIG. 5 is a flowchart illustrating the automatic updating of hierarchical whitelists according to an embodiment. A trusted user sends a message (500). The user's whitelist is updated to include recipient information (502). Then, a whitelist of the group that includes the trusted user is also updated (504). A corporate whitelist is then updated (506), as is the global whitelist (508). Although in the embodiment shown, after the trusted user's whitelist is updated, and all the other whitelists in the hierarchy are updated, they are not necessarily all updated in other embodiments. In some embodiments, only the group whitelist is updated and the corporate and the global whitelists are unaffected.

Figure 6:
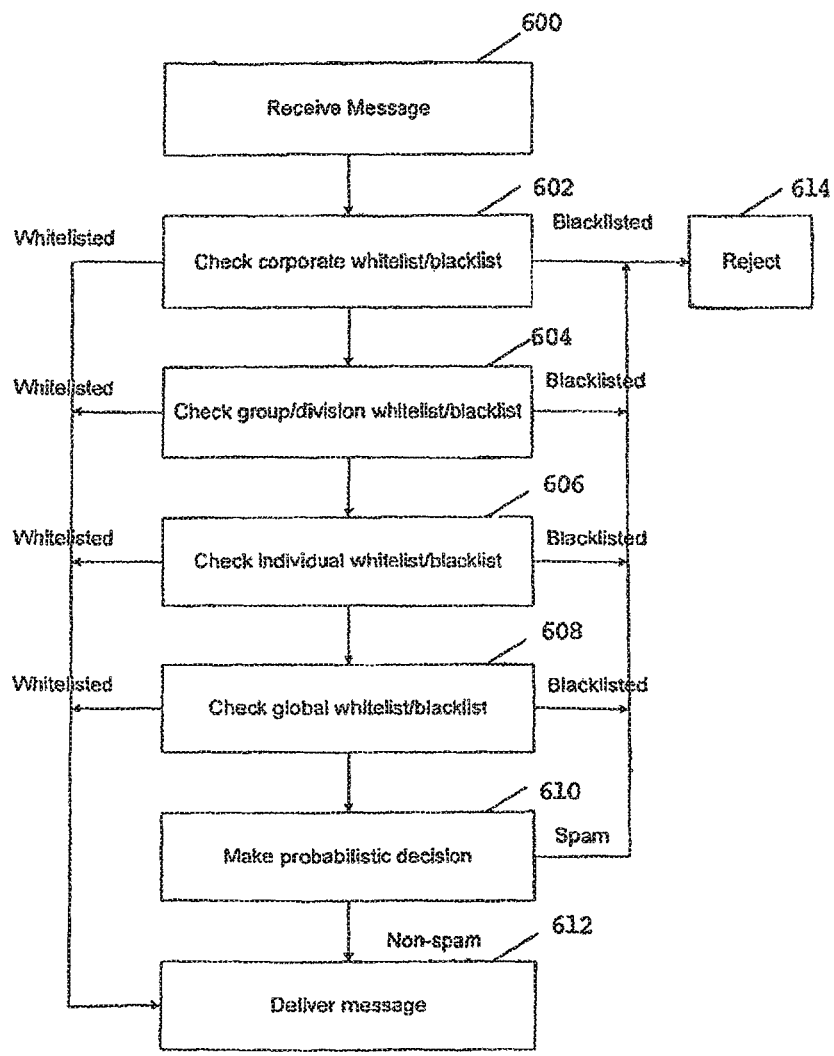
FIG. 6 is a flowchart illustrating a message classification process using hierarchical whitelists and blacklists according to one embodiment.

FIG. 6 is a flowchart illustrating a message classification process using hierarchical whitelists and blacklists according to one embodiment. The whitelists and blacklists are used to help classify messages. Once a message is received (600), the sender's information is first looked up in the corporate whitelist and blacklist (602). If the sender is found to be on the blacklist, the message is classified as spam and rejected (614). If the message is found to be on the corporate whitelist, it is classified as non-spam and delivered to the intended recipient on the network (612). If, however, the sender is found on neither the blacklist nor the whitelist, and a classification cannot be made on the message, the system proceeds to check the sender information on the group or division's whitelist and blacklist (604). If it is found in the blacklist, the message is rejected (614). If it is found in the whitelist, the message is delivered (612).

If a decision cannot be made because the sender information is not found in either the blacklist or the whitelist of the group, the system proceeds to check the individual blacklist and whitelist (606). If the sender information is found in the blacklist, then the message is again rejected. If the sender information is found in the whitelist, then the message is delivered. If a decision cannot be made, the system proceeds to check the global blacklist and whitelist (608). The global blacklist and whitelist is a list obtained from a larger community of users that is made available to the company. A whitelisted or blacklisted sender causes the message to be delivered or rejected accordingly, and an indecision causes the system to make a probabilistic decision (610). The message is either rejected or delivered based on the probabilistic decision. In some embodiments, additional testing is performed to help classify the message.

The hierarchical classification scheme enables policy to be implemented at various corporate levels. In addition, individual preferences are taken into account. Finally, a message that is unclassifiable by the corporation, corporate group or the individual is tested versus whatever database can be obtained from a larger trusted or mostly trusted community. In the embodiment described, the corporate policy and then the group policy supersede the individual. In other embodiments, the hierarchy may change. For example, in one embodiment, the individual lists are checked after corporate policy is enforced and the group is only used if a decision cannot be made from the individual lists.

An improved technique for maintaining a whitelist has been disclosed. The technique obtains message data based on an email message: sent by a user, and extracts recipient information from the message data. The whitelist is then updated based on the recipient information. The technique allows the whitelist to be automatically updated using message data obtained from a variety of sources, thereby making the maintenance of whitelists less cumbersome for the users, and improve the quality and effectiveness of the whitelists.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

For example, some embodiments may include a computer program product for maintaining a whitelist. The computer program product may be embodied in a computer readable medium. The computer program may include computer instructions for maintaining a whitelist.

What is claimed is:

1. A method for filtering messages, the method comprising:
   storing one or more data sets in a memory at a private network, the one or more data sets identifying a plurality of data sources;
   identifying a data source of an incoming message sent to one or more users of a private network;
   performing a first analysis on the incoming message that compares the identified data source to the plurality of data sources stored in the memory at the private network, the first analysis resulting in the incoming message being identified as unclassifiable;
   accessing an external database associated with a trusted community when the incoming message is identified as unclassifiable, wherein the external database is accessed to retrieve a list of one or more allowable message sources;
   performing a second analysis on the incoming message that compares the identified data source to the list of allowable message sources from the external database, wherein the second analysis results in allowing the incoming message to be delivered to the one or more users of the private network;
   identifying that an outgoing message from at least one user of the one or more users has been sent to the data source of the incoming message; and
   updating a first data set of the one or more data sets, the first data set associated with the at least one user, wherein the updated first data set indicates that subsequent incoming messages from the data source are allowed to be delivered to the at least one user without requiring the second analysis.

2. The method of claim 1, further comprising:
   receiving a second outgoing message from the at least one user and sent to a recipient; and
   updating the first data set associated with the at least one user to identify the recipient, wherein the updated first data set indicates that incoming messages from the recipient are allowed to be delivered to the at least one user without requiring the second analysis.

3. The method of claim 2, further comprising sending the second outgoing message to at least the recipient.

4. The method of claim 1, further comprising:
   receiving votes from one or more user devices, the votes indicating whether one or more messages sent from a sender are identified as being associated with spam; and
   calculating a spam probability that the identified sender is associated with spam based on the received votes.

5. The method of claim 4, further comprising identifying that the identified sender is associated with spam based on the calculated spam probability meeting at least a threshold value.

6. The method of claim 4, further comprising identifying that the identified sender is not associated with spam based on the calculated spam probability not meeting a threshold value.

7. The method of claim 1, further comprising:
   receiving a second incoming message from a sender that is not currently identified in any of the stored data sets; and
   assigning an initial non-zero value to the sender of the second message based on a policy associated with messages received from senders that are not currently identified in the stored data sets, wherein the non-zero value sets a counter associated with the second incoming message and with at least one of the stored data sets.

8. A non-transitory computer-readable storage medium having embodied thereon a program executable by a processor for implementing a method for filtering messages, the method comprising:
   storing one or more data sets in a memory at a private network, the one or more data sets identifying a plurality of data sources;

identifying a data source of an incoming message sent to one or more users of a private network;

performing a first analysis on the incoming message that compares the identified data source to the plurality of data sources stored in the memory at the private network, the first analysis resulting in the incoming message being identified as unclassifiable;

accessing an external database associated with a trusted community when the incoming message is identified as unclassifiable, wherein the external database is accessed to retrieve a list of one or more allowable message sources;

performing a second analysis on the incoming message that compares the identified data source to the list of allowable message sources from the external database, wherein the second analysis results in allowing the incoming message to be delivered to the one or more users of the private network;

identifying that an outgoing message from at least one user of the one or more users has been sent to the data source of the incoming message; and updating a first data set of the one or more data sets, the first data set associated with the at least one user, wherein the updated first data set indicates that subsequent incoming messages from the data source are allowed to be delivered to the at least one user without requiring the second analysis.

9. The non-transitory computer-readable storage medium of claim 8, further comprising instructions executable to:

receive a second outgoing message from the at least one user and sent to a recipient; and update the first data set associated with the at least one user to identify the recipient, wherein the updated first data set indicates that incoming messages from the recipient are allowed to be delivered to the at least one user without requiring the second analysis.

10. The non-transitory computer-readable storage medium of claim 9, further comprising instructions executable to send the second outgoing message to at least the recipient.

11. The non-transitory computer-readable storage medium of claim 8, further comprising instructions executable to:

receive votes from one or more user devices, the votes indicating whether one or more messages sent from a sender are identified as being associated with spam; and calculate a spam probability that the identified sender is associated with spam based on the received votes.

12. The non-transitory computer-readable storage medium of claim 11, further comprising instructions executable to identify that the identified sender is associated with spam based on the calculated spam probability meeting at least a threshold value.

13. The non-transitory computer-readable storage medium of claim 11, further comprising instructions executable to identify that the identified sender is not associated with spam based on the calculated spam probability not meeting a threshold value.

14. The non-transitory computer-readable storage medium of claim 8, further comprising instructions executable to:

receive a second incoming message from a sender that is not currently identified in any of the stored data sets; and assigning an initial non-zero value to the sender of the second message based on a policy associated with messages received from senders that are not currently identified in the stored data sets, wherein the non-zero value sets a counter associated with the second incoming message and with at least one of the stored data sets.

15. An apparatus for filtering messages, the apparatus comprising:

memory at a private network that stores one or more data sets, the one or more data sets identifying a plurality of data sources;

a communication interface that receives an incoming message that is identified as being sent from a data source and sent to one or more users of a private network; and a processor that executes instructions stored in the memory, wherein execution of the instructions by the processor:

performs a first analysis on the incoming message that compares the identified data source to the plurality of data sources stored in the memory at the private network, the first analysis resulting in the incoming message being identified as unclassifiable;

accesses an external database associated with a trusted community when the incoming message is identified as unclassifiable, wherein the external database is accessed to retrieve a list of one or more allowable message sources;

performs a second analysis on the incoming message that compares the identified data source to the list of allowable message sources from the external database, wherein the second analysis results in allowing the incoming message to be delivered to the one or more users of the private network;

identifies that an outgoing message from at least one user of the one or more users is addressed to the data source of the incoming message; and updates a first data set of the one or more data sets, the first data set associated with the at least one user, wherein the updated first data set indicates that subsequent incoming messages from the data source are allowed to be delivered to the at least one user without requiring the second analysis.

16. The apparatus of claim 15, wherein the communication interface further receives a second outgoing message from the at least one user; and wherein the processor executes further instructions to:

identify a recipient of the second outgoing message; and update the first data set associated with the at least one user to identify the recipient, wherein the updated first data set indicates that incoming messages from the recipient are allowed to be delivered to the at least one user without requiring the second analysis.

17. The apparatus of claim 16, wherein the processor executes further instructions to send the second outgoing message to at least the recipient.

18. The apparatus of claim 15, wherein the communication interface further receives votes from one or more user devices, the votes indicating whether one or more messages sent from a sender are identified as being associated with spam, and the processor executes further instructions to calculate a spam probability that the identified sender is associated with spam based on the received votes.

19. The apparatus of claim 18, wherein the processor executes further instructions to identify that the identified sender is associated with spam based on the calculated spam probability meeting at least a threshold value.

20. The apparatus of claim 15, wherein the communication interface further receives a second incoming message, and the processor executes further instructions to:

identify that a sender of the second message is not currently included in any of the stored data sets; and assign an initial non-zero value to the sender of the second message based on a policy associated with messages received from senders that are not currently included in the stored data sets, wherein the non-zero value sets a counter associated with the second incoming message and with at least one of the stored data sets.

\* \* \* \* \*